United States Patent [19]
Parker et al.

[11] B 3,925,318

[45] *Dec. 9, 1975

[54] ALKYLATION PROCESS WITH RECOVERY AND REGENERATION OF FLUOROSULFURIC ACID CATALYST

[75] Inventors: Paul T. Parker, Baton Rouge, La.; Ivan Mayer, Summit, N.J.

[73] Assignee: Exxon Research & Engineering Company, Linden, N.J.

[ * ] Notice: The portion of the term of this patent subsequent to Oct. 16, 1990, has been disclaimed.

[22] Filed: July 30, 1973

[21] Appl. No.: 383,581

[44] Published under the Trial Voluntary Protest Program on January 28, 1975 as document no. B 383,581.

Related U.S. Application Data

[63] Continuation of Ser. No. 236,737, March 21, 1974, Pat. No. 3,766,293.

[52] U.S. Cl.............................. 260/683.58; 252/415
[51] Int. Cl.².......................................... C07C 3/54
[58] Field of Search.............................. 260/683.58

[56] References Cited
UNITED STATES PATENTS
3,766,293  10/1973  Parker et al.................. 260/683.58

Primary Examiner—Delbert E. Gantz
Assistant Examiner—G. J. Crasanakis
Attorney, Agent, or Firm—A. D. Litt; John W. Ditsler

[57] ABSTRACT

The present invention provides an improved alkylation process comprising: contacting an olefin and a paraffin with an alkylation catalyst comprising fluorosulfuric acid, at alkylation conditions, in an alkylation reactor, thereby forming a hydrocarbon phase comprising alkylate reactor product and containing at least a portion of the catalyst; washing the hydrocarbon phase with an acid comprising sulfuric acid to form an acid phase containing fluorosulfuric acid, hydrofluoric acid, and sulfuric acid; contacting the acid phase with water thereby converting at least a portion of the fluorosulfuric acid to hydrogen fluoride and sulfuric acid; removing at least a portion of the hydrogen fluoride from the acid phase by contacting the same with a paraffin such as n-butane thereby forming a hydrocarbon phase containing hydrogen fluoride; treating the hydrocarbon phase with sulfur trioxide to regenerate the fluorosulfuric acid; and recycling at least a portion of the regenerated fluorosulfuric acid to the alkylation zone to be used as an alkylation catalyst therein.

14 Claims, 1 Drawing Figure

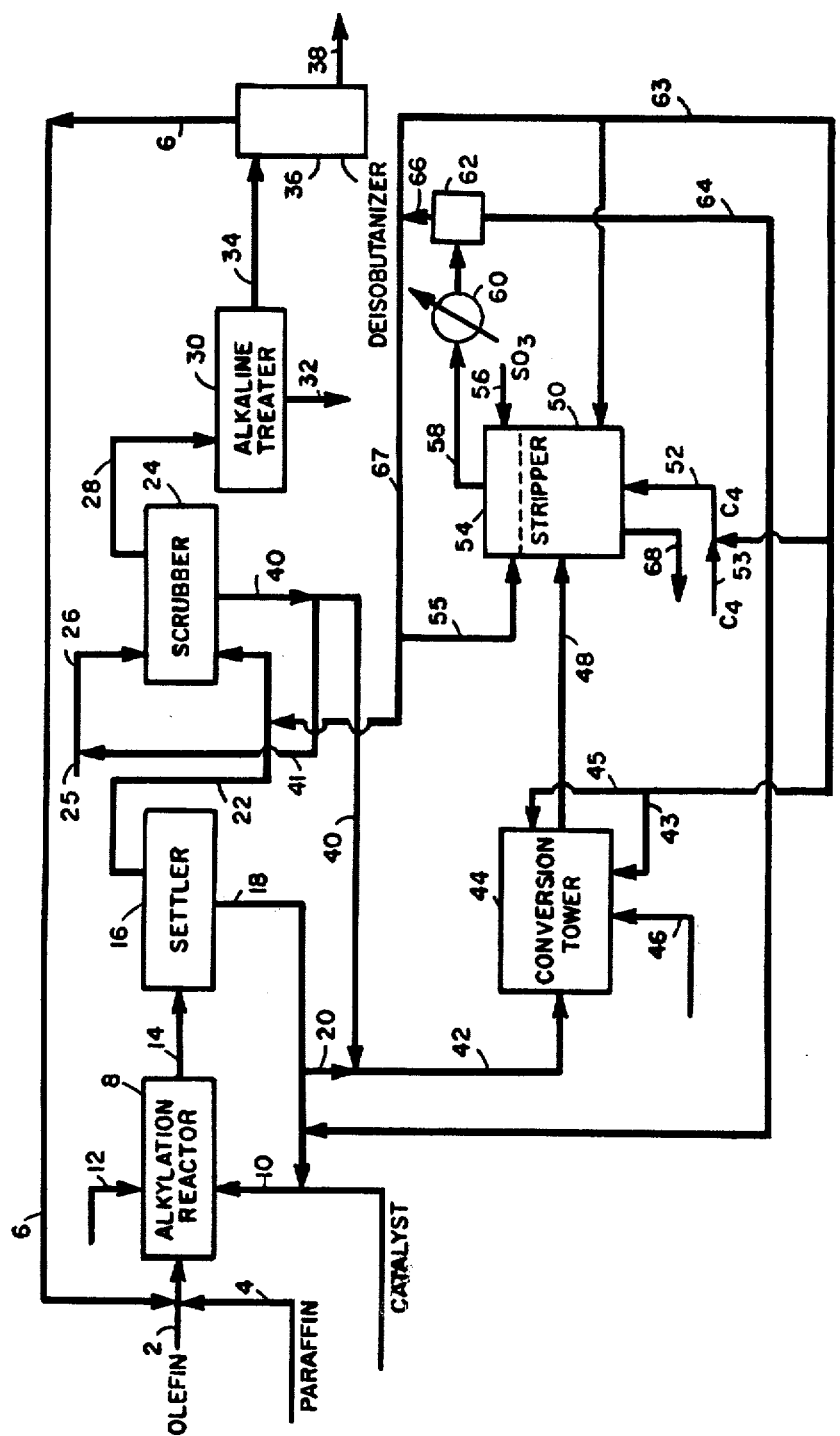

ALKYLATION PROCESS WITH RECOVERY AND REGENERATION OF FLUOROSULFURIC ACID CATALYST

This application is a continuation of U.S. Ser. No. 236,737, filed Mar. 21, 1974, now U.S. Pat. No. 3,766,293, issued Oct. 16, 1973.

BACKGROUND OF THE INVENTION

1. Field of the Invention

The present invention relates to a hydrocarbon conversion process. More particularly, the invention relates to an improved alkylation process employing a catalyst comprising fluorosulfuric acid wherein the fluorosulfuric acid present in the alkylation product is recovered and regenerated.

2. Description of the Prior Art

Acid catalyzed hydrocarbon conversion processes comprising contacting an alkane with an alkene are well known. The reactants are generally contacted in the liquid phase and within a broad temperature range of from about $-100°$ to $100°F$. with an acid catalyst such as, for example, sulfuric acid, fluorosulfuric acid or a halogen acid, such as hydrofluoric acid.

Alkylation processes employing fluorosulfuric acid as a catalyst are described in U.S. Pat. Nos. 2,313,103, 2,344,469 and U.K. Pat. No. 537,589. The use of other acids such as trifluoromethanesulfonic acid as alkylation catalysts has also been described (T. Gramstad and R. N. Haszeldine, J. Chem. Soc., 1957, 4069–79).

A particularly desirable alkylation process is disclosed in copending U.S. Patent application, Ser. No. 201,389, filed Nov. 23, 1971, and assigned to the same assignee as herein. According to an advantageous embodiment of this copending application, the alkylation process is conducted in the presence of a catalyst mixture comprising: (1) a major amount of strong acid catalyst comprising a fluorosulfuric acid and, if desired, one or more other strong acids such as another halosulfuric acid ($XSO_3H$) or trahalomethanesulfonic acid ($CX_3SO_3H$); in combination with (2) a minor amount of one or more catalyst promoters comprising water; aliphatic and cycloaliphatic alcohols, thiols, ethers and thioethers; aliphatic, cycloaliphatic and aromatic sulfonic and carboxylic acids and their derivatives; or inorganic acids.

Typically, according to this process, a suitable $C_2$–$C_{12}$ terminal or internal olefin, such as butene-1, is reacted with a straight or branched chain $C_2$–$C_{10}$ paraffin, such as isobutane, in the presence of the fluorosulfuric acid catalyst and a promoter such as water. The reaction is advanced by maintaining the reactants and catalyst in intimate physical contact. After a sufficient period of time, the catalyst/promoter phase, hereinafter referred to as the acid phase, is allowed to settle from the hydrocarbon phase and is then withdrawn. This partially spent catalyst may be partially or wholly recycled to the reactor, or a portion thereof can be regenerated or reactivated by any suitable treatment and returned to the alkylation reactor.

While the solubilities of fluorosulfuric acid and hydrofluoric acid in the hydrocarbon phase are small in relative terms, nonetheless, economic losses are sustained due to the incomplete physical separation of the acid and hydrocarbon phases. Furthermore, the acid is highly corrosive, especially at high temperatures, and more than minimal amounts must be prevented from passing to further processing stages, such as the conventionally employed deisobutanizer tower. Yet further, the presence of small amounts of sulfur and fluorine in hydrocarbon fuels pose potential pollution problems, and every effort must be made to not only decrease present levels of pollutants, but also to prevent the creation of further potential pollutants which may ultimately be introduced into the environment. Still further, prolonged contact with the acid may cause degradation of the alkylate product and must be avoided.

SUMMARY OF THE INVENTION

Accordingly, it is an object of the present invention to provide an improved alkylation process employing a catalyst comprising fluorosulfuric acid wherein at least a portion of the acid dissolved and/or dispersed in the alkylate reactor product is recovered and regenerated.

This and other objects are accomplished by the present invention which provides an improved alkylation process comprising: contacting an olefin and a paraffin with an alkylation catalyst comprising fluorosulfuric acid, at alkylation conditions in an alkylation reactor thereby forming a hydrocarbon phase comprising alkylate reactor product and containing at least a portion of the catalyst; washing at least a portion of the hydrocarbon phase with an acid comprising sulfuric acid forming an acid phase containing fluorosulfuric acid, hydrofluoric acid and sulfuric acid and a hydrocarbon phase containing alkylate reactor product; contacting the acid phase with water thereby converting at least a portion of the fluorosulfuric acid to hydrogen fluoride and sulfuric acid; removing at least a portion of the hydrogen fluoride from the thus treated acid phase by contacting the same with a paraffin to thereby form a hydrocarbon phase containing hydrogen fluoride; treating the thus formed hydrocarbon phase with sulfur trioxide to regenerate the fluorosulfuric acid; and using at least a portion of the regenerated fluorosulfuric acid as an alkylation catalyst. In a preferred embodiment, the regenerated acid catalyst is recycled to the alkylation zone.

The invention will become more apparent in view of the ensuing discussion and accompanying drawing which schematically represents one embodiment of the present invention. A detailed description of the catalyst recovery and regeneration system of the instant invention is presented below in conjunction with the discussion of the drawing.

According to the present invention, an alkylation process is conducted in the presence of a catalyst mixture comprising fluorosulfuric acid. In a preferred embodiment, the catalyst comprises: (1) a major amount of a strong acid catalyst comprising fluorosulfuric acid and, if desired, one or more other strong acids such as another halosulfuric acid ($XSO_3H$), trihalomethanesulfonic acid ($CX_3SO_3H$) or mixtures thereof; in combination with (2) a minor amount of one or more catalyt promoters comprising water; aliphatic and cycloaliphatic alcohols, and ethers; aliphatic, cycloaliphatic and aromatic sulfonic and carboxylic acids and their derivatives; or inorganic acids.

The alcohols preferably contain 1 to 10 carbon atoms and 1 to 10 hydroxyl groups per molecule. The lower molecular weight saturated alcohols are most preferred and desirably contain 1 to 7 carbon atoms and 1 to 4 hydroxyl groups per molecule. The ethers are preferably saturated and contain 2 to 10, preferably 2 to 5, carbon atoms per molecule. In the latter instance, while monoether compounds are preferred promoters, compounds containing up to 3 or more alkoxy groups are also contemplated. The sulfonic and carboxylic acids preferably contain 1 to 10, most preferably 1 to 7 carbon atoms per molecule. In addition, the acids can be substituted with one or more carboxy or sulfo groups. The acid derivatives include the esters and anhydrides and preferably contain 2 to 20, most preferably 2 to 10, carbon atoms per molecule.

The aliphatic, cycloaliphatic and aromatic portions of the aforementioned promoters optionally can be substituted with a variety of substituents such as halogen atoms, and such groups as hydroxy, $C_1$ to $C_5$ alkoxy, $C_1$ to $C_5$ perhaloalkyl, $C_2$ to $C_6$ carboalkoxy, carboxy, $C_1$ to $C_{10}$ hydrocarbyl, preferably $C_1$ to $C_5$ alkyl or $C_3$ to $C_{10}$ cycloalkyl, or combinations thereof.

The inorganic acids will, in general, be less acidic than the strong acid component of the catalyst system and desirably will have $H_0$ values, i.e. $-\log h_0$ (Hammett acidity function), greater than about $-11$ (see Gould, E. *Mechanism and Structure in Organic Chemistry*, New York, Holt, Rinehart and Winston, 1959, 106). Preferred inorganic acids contain 1 to 4 hydroxyl groups per molecule.

The catalyst promoter may be used effectively with a wide variety of strong acids. Examples of strong acid components of the strong acid/promoter catalyst system which can be used in combination with fluorosulfuric acid are other halosulfuric acids, such as chlorosulfuric acid and bromosulfuric acid; trihalomethanesulfonic acids, such as trifluoromethanesulfonic acid, trichloromethanesulfonic acid and tribromomethanesulfonic acid; or mixtures thereof and the like. The preferred strong acid portion of the catalyst system includes fluorosulfuric acid, alone or in combination with trifluoromethanesulfonic acid. In addition, the phosphorus analog of trihalomethanesulfonic acid, i.e., trihalomethanephosphonic acid, may be an effective strong acid.

Illustrative, non-limiting examples of useful promoter compositions include:
water
methanol
ethanol
n-propanol
isobutanol
3-chloro-2-methyl-1-butanol
6-mercapto-4-methoxy-2-hexanol
2,2-dimethyl-4-methylthio-3-perfluoromethyl-1-hexanol
4,4-dimethyl-3-phenolthio-1-heptanol
5-carbethoxy-4,4-dimethyl-1-pentanol
2-decanol
cyclopropanol
cyclopentanol
2-chlorocyclohexanol
cyclodecanol
1,2-dihydroxyethane
1,2,3-trihydroxypropane
2,4,5-trihydroxypentane
1,3,5-trihydroxycyclohexane
1,2-dihydroxycyclooctane
pentaerythritol
methylsulfonic acid
2-chloroethylsulfonic acid
propylsulfonic acid
ethyl propanesulfonate
methyl-2-phenoxyethanesulfonate
benzenesulfonic acid
formic acid
acetic acid
propionic acid
butyric acid
hepanoic acid
decanoic acid
benzoic acid
ethyl acetate
methyl butanoate
propyl decanoate
ethyl benzoate
2-chlorobutanoic acid
2-hydroxy-5-methylhexanoic acid
phenyl acetate
trifluoroacetic acid
3,3,3-trifluoropropionic acid
acetic anhydride
propionic anhydride
ethanoic anhydride
butanoic anhydride
oxalic acid
malonic acid
phthalic acid
diethylmalonate
1,2,3-tricarboxypropane
dimethyl ether
diethyl ether
diphenyl ether
dipropyl ether
dioctyl ether
ethyl methyl ether
chloromethyl ethyl ether
dicyclobutyl ether
dinonyl ether
decyl nonyl ether
1-methoxycyclopentyl ethyl ether
ethylene oxide
phosphoric acid
phosphorous acid
sulfuric acid
sulfurous acid
monofluorophosphoric acid
difluorophosphoric acid
orthophosphoric acid
pyrophosphoric acid
polyphosphoric acid Preferred catalyst promoters contain either a hydroxy group, such as alcohols or a hydroxy group precursor, such as ethers which cleave to form alcohols under the acidic conditions of the subject invention. Of these, the most preferred compounds are the alcohols and water. It is noted that while the catalyst promoter and strong acid are desirably premixed prior to introduction into the reactor, the process also contemplates the in situ formation of the catalyst system.

Aromatic compounds are generally not preferred as catalyst promoters since competitive sulfonation of the aromatic ring occurs under the alkylation reaction conditions. However, if the aromatic nuclei are sufficiently deactivated, with regard to electrophilic substitution, they are then effective promoters. Thus, for example, electron withdrawing groups such as —COOH, —SO₃H, —COOR and the like are believed to sufficiently deactivate aromatic rings to permit their use in the subject process. In general, aromatic ring substituents with Hammett $\delta_{meta}$ and $\delta_{para}$ values equal to or greater than +0.01 are acceptable. For a more detailed discussion of the Hammett equation and electrophilic aromatic substitution in general, see *Mechanism and Structure in Organic Chemistry*, by Edwin S. Gould, 1959, Holt, Rinehart & Winston, Inc., pp. 220–227 and 412–463. Additionally, it is noted that highly basic materials such as amines, for example triethylamine, cannot generally be used in the concentration range of the subject process due to reaction with the strong acid.

While inorganic acids such as HCl, HBr and HI may be used as promoters, their effectiveness is diminished by their tendency to form stable halides with the olefin reactants. Halide formation, however, is not an important problem with HF. Additionally, oxidative acids such as $HNO_3$ and $HClO_4$ cannot be used as promoters due to oxidative side reactions with the olefins.

It has been found that the concentration of the promoter in the two-component catalyst system is an important variable in the production of high quality alkylate. The promoter is admixed with the strong acid catalyst component in amounts ranging from about 5 to 45 mole % based on acid, preferably 10 to 30 mole %, and still more preferably 15 to 25 mole %, for example 20 mole %. In some instances, however, it may be desirable to use somewhat lower or higher amounts of promoter where, for example, increased catalyst activity or selectivity is desired.

In the case of hydroxyl-containing promoters, (or promoters containing hydroxyl precursors, i.e. latent hydroxyl groups) concentration of the promoter in the total catalyst may fall below the above-specified concentration range, i.e. 5 to 45 mole %. It appears that the promoting efficiency of hydroxy compounds is directly related to the overall number of hydroxyl groups or latent hydroxyl groups present per molecule. Thus, ethanol with one hydroxyl group should have promoter activity similar to 0.5 mole of ethylene glycol with two hydroxyl groups. Hence, as the number of hydroxyl groups or latent hydroxyl groups per molecule of promoter increases, the required concentration of the total compound in the catalyst will decrease.

Although the broad concentration ranges are generally independent of the type of promoter used, the preferred or optimal range will vary depending on the structure of the promoter, the reaction temperature, the concentration of olefin in the feed and the olefin space velocity.

In addition to classical alkylation processes as hereinabove described, the subject invention may also include self-alkylation processes. The $C_6-C_{16}$ branched chain olefins and $C_4-C_8$ isoparaffins are preferred reactants. The process is generally conducted in the liquid phase whereby the isoparaffin is dimerized and the olefin is saturated producing an alkylate-type product of high quality. Self-alkylation processes are generally described in U.S. Pat. No. 3,150,204. Undesired side reactions are minimized using the above-described catalyst systems, thereby providing high yields of the desired products.

In general, the amount of olefin contacted with the catalyst can range from about 0.05 to 1000 volumes of olefin per hour per volume of catalyst inventory in the reactor (v/v/hr.), i.e. olefin space velocity. Preferably, the olefin space velocity ranges from about 0.05 to 10.0 v/v/hr., and still more preferably from about 0.05 to 1.0 v/v/hr., e.g. 0.1 v/v/hr. The volume % of total catalyst in the reaction mixture or emulsion (when liquid phase operations are used) in the reactor can range from about 40 to 80 volume % based on total reaction mixture and preferably from about 50 to 70 volume %. The isoparaffin concentration, including alkylate, in the hydrocarbon phase (in a liquid phase process) can range from 40 to 100 volume % based on the total volume of the hydrocarbon phase and preferably from 50 to 90 volume %. Such isoparaffin concentrations can be maintained by recycling unreacted isoparaffin to the reactor.

Suitable olefinic reactants include $C_2-C_{12}$ terminal and internal monoolefins such as ethylene, propylene, isobutyline, butene-1, butene-2, trimethylethylene, the isomeric pentenes and similar higher monoolefinic hydrocarbons of either a straight chain or a branched chain structure. Preferably the $C_2-C_6$ monoolefins are used, although the highly branched $C_7-C_{12}$ monoolefins may also be used. The reaction mixtures may also contain some small amounts of diolefins. Although it is desirable from an economic standpoint to use the normally gaseous olefins as reactants, normally liquid olefins may be used. Thus the invention contemplates the use of reactable polymers, copolymers, interpolymers, and the like, of the above-mentioned olefins, such as, for example, the diisobutylene and triisobutylene polymers, the codimer of normal butylene and isobutylene, of butadiene and isobutylene, and the like. Mixtures of two or more of the olefins above described can be used as the process feedstock.

The instant process is particularly adapted to refinery alkylation processes, and contemplates the use of various refinery cuts as feedstocks. Thus, $C_2$, $C_3$, $C_4$ and/or $C_5$ olefin cuts from thermal and/or catalytic cracking units; field butanes which have been subjected to prior isomerization and partial dehydrogenation treatment; refinery stabilizer bottoms; spent gases; normally liquid products from sulfuric acid or phosphoric acid catalyzed polymerization and copolymerization processes; and products, normally liquid in character, from thermal and/or catalytic cracking units, are all excellent feedstocks for the present process. Such feeds are preferably dried to control excess water buildup, i.e. about 5 to 15 ppm (weight) of water before entering the reactor.

The hydrocarbon feedstocks that are reacted with the olefins desirably comprise branched chain $C_2-C_{10}$ paraffins such as hexane, butane and the like, and, preferably, $C_4-C_6$ isoparaffins such as isobutane, isopentane, isohexane and the like. While open chain hydrocarbons are preferred, cycloparaffins may also be used.

Catalyst that is carried over in the akylate reactor product is recovered and regenerated according to the process of the invention which is discussed in more detail below.

BRIEF DESCRIPTION OF THE DRAWING

The drawing is a flow scheme of the invention.

Referring now to the drawing in detail, the olefin which is introduced via line 2 is, preferably, admixed with the paraffin from lines 4 and 6 before introducing the combined stream into the reactor 8. If desired, however, the olefin and paraffin streams can be fed directly into the reactor 8. The olefin concentration in the feed ranges from 0.5 to 25 volume % based on total feed and preferably below 10 volume %. Translated into volume ratios, high volume ratios of paraffin to olefin ranging from 10:1 to 200:1 or higher are preferred, although somewhat lower ratios may be used, i.e. 3:1. Correspondingly high volume ratios of paraffin to olefin are also desired within the reaction zone. Preferably, the paraffin/olefin ratio therein ranges from about 20:1 to 2,000:1 or higher. The catalyst mixture comprising fluorosulfuric acid and a promoter such as water is introduced into the reactor via line 10 and additional water can be introduced into the reactor via line 12.

The process may be carried out either as a batch or continuous type of operation, although it is preferred for economic reasons to carry out the process continuously. It has been generally established that in alkylation processes, the more intimate the contact between the feedstock and the catalyst the better the yield of saturated product obtained. With this in mind, the present process, when operated as a batch operation, is characterized by the use of vigorous mechanical stirring or shaking of the reactants with the catalyst.

In continuous operations, as that of the embodiment shown in the drawing, the reactants may be maintained at sufficient pressures and temperatures to maintain them substantially in the liquid state and then continuously forced through dispersion devices into the reaction zone. The dispersion devices may be jets, porous thimbles and the like. The reactants are subsequently mixed with the catalyst in the reactor 8 by conventional mixing means (not shown) such as mechanical agitators and the like. While the alkylation reaction can be carried out at a temperature within the range of from about −80° to +100°F., fairly low reaction temperatures, preferably within the range of from about −80° to +70°F., and most preferably within the range of from about −20° to about +40°F., are usually employed. Where the reaction is carried out at temperatures about +10°F., or higher it is necessary that the reaction be conducted under superatmospheric pressure, if both the reactants and the catalyst are to be maintained substantially in a liquid state. Typically, the alkylation reaction is conducted at pressures varying from about 1 to 20 atmospheres.

In general it is preferable to employ pressures sufficiently high to maintain the reactants in the liquid phase, although a vapor phase operation is also contemplated. Autorefrigerative reactors and the like may be employed to maintain liquid phase operation. Although it is preferred to run the reaction neat, solvents or diluents may be employed, if desired.

After allowing sufficient residence time for the reaction to progress, typically on the order from about five minutes to one hour or more, the reaction mixture is withdrawn from the reactor via line 14 and passed into a settler 16. The reaction mixture will separate in the settler 16 into a heavy acid phase containing the fluorosulfuric acid and promoter and a hydrocarbon phase containing the alkylate product along with smaller amounts of fluorosulfuric acid, hydrogen fluoride and water which are dispersed and/or dissolved in the alkylate product. The acid phase is withdrawn from the settler 16 via line 18 and at least a portion thereof can be recycled to the reactor 8 via line 10 or charged to another alkylation reactor, if desired. A purge stream 20 may be withdrawn from line 18 and passed to a regeneration stage which will be discussed in more detail hereinbelow. The hydrocarbon phase is withdrawn from settler 16 via line 22 and passed into a scrubber 24 wherein it is intimately contacted with sulfuric acid which is introduced via line 16. The sulfuric acid is preferably concentrated being, 99.5 to 100% $H_2SO_4$, but somewhat more dilute acid (97–98%) can also be used without substantial detriment to the efficiency of the process. Make-up sulfuric acid is introduced into line 26 via line 25.

As previously noted, the hydrocarbon phase contains dissolved and/or dispersed fluorosulfuric acid, water, hydrogen fluoride from partial dissociation of the acid, and other acidic materials such as sulfur dioxide, etc. It has been found that the acid materials which are dissolved and/or dispersed in the hydrocarbon phase can be effectively removed by scrubbing the hydrocarbon phase with concentrated sulfuric acid. The manner of scrubbing may be by any conventional means, such as by passing the sulfuric acid and hydrocarbons through a mixing orifice, a countercurrent contacting tower or by injecting them into a centrifugal pump, etc., as long as intimate contact between the hydrocarbon phase and the sulfuric acid is attained. The ratio of acid to hydrocarbon is not critical, but can vary from about 5 to 95% of the hydrocarbon stream. The ratio is controlled by recycling acid from line 40 through line 41 to line 26. The temperature for scrubbing generally ranges from about 20° to 100°F. and the pressure may be any pressure from atmosphere to about 500 psig. The resulting phases are settled after contacting.

While the sulfuric acid scrubber removes most of the acidic materials from the hydrocarbon phase, trace amounts of acid materials, primarily $H_2SO_4$, remain in the effluent from the scrubber. The effluent hydrocarbon is withdrawn from the sulfuric acid scrubber via line 28 and is passed to an alkaline treater 30 which frees the hydrocarbon phase of the remaining trace amounts of acid. The alkaline treater may be of any conventional construction, such as the type wherein solid alkali metal oxides such as potassium oxide and sodium oxide react with sulfuric acid to form potassium sulfate, potassium fluoride, sodium sulfate, sodium fluoride and water which are removed from the hydrocarbon phase, such as by line 32, in the drawing. The hydrocarbon phase is then removed from the alkaline treater via line 34 and passed to a deisobutanizer tower 36. The deisobutanizer 36 may be a deisobutanizing tower of conventional construction to separate the hydrocarbon phase into an isobutane stream, which can be withdrawn by line 6 for recycle to the alkylation reactor 8, and the final product of the alkylation process which is withdrawn via line 38. If desired, the isobutane need not be recycled to the reactor and can be sent on to further processing elsewhere.

Returning now to scrubber 24, the sulfuric acid stream is withdrawn therefrom via line 40 and, if desired, combined with the purge stream 20. The combined stream flows via line 42 to a conversion tower 44 wherein sufficient water is injected via line 46 to convert the fluorosulfuric acid to free hydrogen fluoride and sulfuric acid according to the reaction:

$$H_2O + HSO_3F \rightleftharpoons H_2SO_4 + HF\uparrow + \text{heat}$$

In one embodiment of the invention, it may be desirable to add up to a mole of water in excess of the stoichiometric amount required. Preferably, less than about 0.5 mole excess water is used. The resulting stream of water, hydrogen fluoride, sulfuric acid and fluorosulfuric acid is removed from the conversion tower 44 via line 48 and passed to stripper 50 wherein the hydrogen fluoride is stripped from this stream by intimately contacting it with a stream of hydrocarbons introduced via line 52. Preferably n-butane is used. It is noted that, in one embodiment of the invention, the conversion tower and stripper comprise a single vessel. In the upper section 54 of the stripper 50 the hydrogen fluoride is reacted with sulfur trioxide according to the reaction:

$$HF + SO_3 \rightarrow HSO_3F + heat.$$

The sulfur trioxide, which is introduced via line 56, thus regenerates the fluorosulfuric acid catalyst which, together with the hydrocarbon and some water is taken overhead via line 58, condensed in a condenser 60, and passed to separator 62 wherein the fluorosulfuric acid is separated from the hydrocarbons present in the stream. The regenerated fluorosulfuric acid stream containing water is withdrawn from the separator via line 64 and at least a portion thereof is combined with the recycle stream 18 for return to the reactor 8 via line 10. The hydrocarbon phase is removed from the separator 62 via line 66. At least a portion of the hydrocarbon is recycled to line 22 for additional processing or to tower 44 and stripper 50 via lines 55, 63, 43 and 45 for temperature control purposes. In addition some of the hydrocarbon can be used as part of the stripping agent in stripper 50, being introduced therein via line 52. Additional hydrocarbon stripping agent can be introduced into the stripper via line 53. The sulfuric acid sludge can be removed from the bottom of the regeneration tower 50 via line 68 and sent for sulfuric acid regeneration (not shown) for carbon removal and reconcentration, or it can be discarded. The stripper 50 is generally operated at temperatures ranging from about 120° to 300°F., preferably 150° to 200°F., and pressures from about 30 to 100 psig; however, it is customary to adjust the temperatures and pressures to maintain the proper phase relationships in the process.

While any saturated hydrocarbon can be used for the stripping operation in tower 50, it has been found to be highly advantageous to employ n-butane because, when contacted with the hydrogen fluoride and fluorosulfuric acid in the tower, the n-butane is partially isomerized to the desired isobutane used as feed to the alkylation reactor. Accordingly, the hydrocarbon phase removed from separtor 62 contains considerable isobutane which after scrubbing can be removed by the deisobutanizer 36 and passed via line 6 to be mixed directly with the olefin feed in line 2.

The following examples are presented for the purpose of more clearly illustrating the present invention. Unless otherwise specified, all percentages and parts are by weight.

EXAMPLE 1

A sample of a commercial alkylate containing fluorosulfuric acid was divided into two portions, part A and part B. Part A was washed thoroughly with dilute sodium hydroxide and the aqueous phase was then separated and analyzed for sulfate. The amount of sulfate was found to be equivalent to 0.121 weight percent fluorosulfuric acid based on the hydrocarbon. Part B was stirred with concentrated sulfuric acid for 30 minutes and the mixture was allowed to settle. The hydrocarbon phase was separated and washed with excess, dilute sodium hydroxide. The aqueous phase obtained from this washing, was separated and analyzed for sulfate. The amount of sulfate was found to be equivalent to 0.016 weight percent fluorosulfuric acid based on the hydrocarbon. Thus, it is seen, according to this example, that approximately 91.7% of the fluorosulfuric acid was removed from the hydrocarbon.

EXAMPLE 2

Approximately 1600 grams of n-hexane containing fluorosulfuric acid was divided into two parts, part A and part B. Part A was washed with excess dilute sodium hydroxide and the aqueous phase separated and analyzed for sulfate. The sulfate was found to be present in an amount equivalent to 0.632 weight percent fluorosulfuric acid, based on hydrocarbon. Part B was pumped through 100 cc of vigorously stirred (500–550 rpm), concentrated (97–98%) sulfuric acid at room temperature at a rate of about 8.7 v/v/hr. based on the acid. A total of about 1,000 cc of the n-hexane was pumped through the acid. The collected, scrubbed n-hexane was washed with excess dilute sodium hydroxide, and the resulting aqueous solution was then separated and analyzed for sulfate. The amount of sulfate was found to be equivalent to 0.0037 weight percent fluorosulfuric acid based on hydrocarbon. Thus, it is seen that approximately 99.5% of the fluorosulfuric acid was removed from the hydrocarbon by treatment with the sulfuric acid.

EXAMPLE 3

A mixed olefin and fresh isobutane feed comprising n—$C_3H_8$, $C_4H_8$, i—$C_4H_{10}$ and n—$C4H_{10}$ at a total flow rate of 10,000 B/D is combined with a recycle isobutane stream comprising n—$C_3H_8$, i—$C_4H_{10}$ and n—$C_4H_{10}$ at a flow rate of 28,560 B/D and then passed into an alkylation reactor at a total flow rate for the combined feed stream of 38,560 B/D, wherein it is mixed with a catalyst mixture of 80 mol % fluorosulfuric acid and 20 mol % water based on acid. The olefin space velocity, based on the acid, is maintained at about 0.27 v/v/hr. The autorefrigerated reactor is maintained at a temperature of about 20°F. and a pressure of about 1.1 psig. Intimate mixing in the reactor is achieved by means of turbine mixers. The volume % acid in the reactor emulsion is maintained at about 50%.

The alkylation reactor product, 37,055 B/D, containing about 70 vol. % isobutane, is passed to a settler where it is separated from about 37,055 B/D of catalyst into a hydrocarbon phase and an acid phase. The hydrocarbon phase contains about 600 PPM(w) fluorosulfuric acid and about 200 PPM (w) hydrogen fluoride. Of the acid phase, about 37,045 B/D is recycled to the reactor and about 10 B/D, containing fluorosulfuric acid and sludge is purged and passed to the catalyst regenerator. The hydrocarbon phase is passed through a mixing orifice with about 100 B/D or less make up concentrated sulfuric acid, the total acid flow rate (fresh + cycle) being about 1,860 B/D, i.e. 1,760 B/D is recycled, to cause intimate mixing of the hydrocarbon phae and the sulfuric acid. As a result of the mixing most of the fluorosulfuric acid and hydrogen fluoride are dissolved in the sulfuric acid phase.

The acid and hydrocarbon phase are separated by gravity settling. The sulfuric acid phase, containing the hydrogen fluoride and fluorosulfuric acid, is combined with the purge stream from the settler and passed into a fluorosulfuric acid regeneration tower. The hydrocarbon phase removed from the scrubbing operation contains trace amounts of acid which are removed by contacting the hydrocarbon phase with solid potassium oxide and sodium oxide. This deacidified hydrocarbon phase is then passed to a deisobutanizer. The combined acid stream, comprising the purge stream from the settler and the acid phase from the scrubber, is passed into the lower portion of the fluorosulfuric acid regeneration tower wherein it is mixed with liquid n-butane at a temperature of about 175°–250°F. Vigorous mixing is achieved by means of liquid butane vaporization.

In the regeneration tower, the n-butane is partially isomerized to isobutane and the fluorosulfuric acid reacts with water to form free hydrogen fluoride and sulfuric acid. The hydrogen fluoride, some remaining fluorosulfuric acid, and the isobutane form a gaseous phase which passes upward through a series of trays to the upper portion of the tower wherein sulfur trioxide gas or liquid is introduced and reacts with the hydrogen fluoride to form fluorosulfuric acid.

The net effect of the reactions taking place in the tower is the generation of heat; accordingly, heat must be continuously removed from the reactor. Heat removal and separation of the fluorosulfuric acid are simultaneously achieved by withdrawing the gaseous phase from the top of the tower and passing it through a condenser to provide a combined stream at a temperature of about 100°F. and a pressure of about 60 to 70 pisg. This combined and cooled stream is then passed into a separator from which the fluorosulfuric acid containing a small amount of water is withdrawn from the bottom and returned to the alkylation reactor. The hydrocarbon phase containing considerable amounts of isobutane may be used for cooling the top of the stripper by using it as reflux or may be used as feed to the conversion tower. The deisobutanized hydrocarbon phase which comprises the final alkylation product, is found to contain only about 1–5 PPM fluorosulfuric acid.

It will be apparent to those skilled in the art that many variations and modifications of the present invention can be made without departing from the spirit and scope of the present invention, which has as a principle feature the reclaiming ani regeneration of a fluorosulfuric acid catalyst in a hydrocarbon alkylation process.

What is claimed is:

1. An improved alkylation process comprising:
  a. contacting an olefin and a paraffin hydrocarbon in an alkylation reactor with an alkylation catalyst comprising fluorosulfuric acid at alkylation conditions to thereby form a mixture of fluorosulfuric acid phase and a hydrocarbon phase containing alkylation reaction product;
  b. settling said mixture into said hydrocarbon phase and said fluorosulfuric acid phase;
  c. washing said hydrocarbon phase with an acid comprising sulfuric acid thereby removing at least a portion of the fluorosulfuric acid present in said hydrocarbon phase;
  d. separating a sulfuric acid phase containing said fluorosulfuric acid from said hydrocarbon phase containing said alkylation reaction product;
  e. contacting said sulfuric acid phase separated in step (d) with water to form an acid-water mixture thereby converting at least a portion of the fluorosulfuric acid contained in said acid phase to hydrogen fluoride and sulfuric acid;
  f. stripping hydrogen fluoride from said acid-water mixture of step (e) with a paraffin hydrocarbon thereby forming a hydrocarbon phase containing hydrogen fluoride;
  g. treating the hydrocarbon phase from step (f) with sulfur trioxide to regenerate fluorosulfuric acid; and
  h. withdrawing said regenerated fluorosulfuric acid from said alkylation process.

2. The method according to claim 1 wherein a portion of said regenerated fluorosulfuric acid withdrawn from said process is added to said alkylation zone to comprise at least a portion of the alkylation catalyst of step (a).

3. The method according to claim 1 wherein the alkylation catalyst comprises a major amount of said fluorosulfuric acid and a minor amount of catalyst promoter.

4. The method according to claim 3 wherein said catalyst promoter is water.

5. The method according to claim 1 wherein the paraffin hydrocarbon of step (f) is n-butane.

6. The method according to claim 5 wherein the n-butane is at least partially isomerized to isobutane by contacting said n-butane with the hydrogen fluoride and the fluorosulfuric acid regenerated in step (g), the resulting isobutane being used as a portion of the paraffin feed in step (a).

7. The method according to claim 1 wherein at least a portion of said fluorosulfuric acid phase in step (b) is recycled to the alkylation reactor of step (a).

8. The method according to claim 7 wherein at least a portion of said fluorosulfuric acid phase is withdrawn from the recycled catalyst prior to the same entering the alkylation reactor, the withdrawn acid is combined with the acid phase from step (d) and the combined acid mixture of said withdrawn acid and said acid phase is then contacted with water according to step (e).

9. The method according claim 1 wherein the contacting of step (a) is carried out at a temperature within the range from about −20° to about +40°F.

10. The method according to claim 1 wherein the contacting of step (a) is carried out at a temperature within the range of about −20° to about +40°F. and the stripping of step (f) is carried out at a temperature within the range from about 120° to about 300°F.

11. The method according claim 1 wherein the washing operation in step (c) is conducted in a countercurrent scrubbing tower.

12. The method according to claim 1 wherein the hydrocarbon phase of step (b) contains HF.

13. The method according to claim 1 wherein the acid phase of step (d) contains HF.

14. A process for recovering fluorosulfuric acid in an alkylation process comprising:
  a. contacting an olefin and a paraffin hydrocarbon in an alkylation reactor with an alkylation catalyst comprising fluorosulfuric acid at alkylation conditions to thereby form a mixture containing a fluorosulfuric acid phase and hydrocarbon phase containing alkylation reaction product;
  b. settling said hydrocarbon phase from said fluorosulfuric acid phase;
  c. washing said hydrocarbon phase with an acid comprising sulfuric acid thereby removing at least a portion of the fluorosulfuric acid from said hydrocarbon phase and forming a sulfuric acid phase containing said fluorosulfuric acid and a hydrocarbon phase containing said alkylation reaction product;
  d. recovering said fluorosulfuric acid from said sulfuric acid phase; and
  e. recovering said alkylation reaction product from step (c).

* * * * *